United States Patent [19]
Holleman, Sr.

[11] Patent Number: 5,406,738
[45] Date of Patent: Apr. 18, 1995

[54] FISHING LURE

[76] Inventor: Jeremiah H. Holleman, Sr., 1621 Chickasaw Dr., Columbus, Miss. 39701

[21] Appl. No.: 177,372

[22] Filed: Jan. 5, 1994

[51] Int. Cl.⁶ ............................................. A01K 85/00
[52] U.S. Cl. .................................. 43/42.15; 43/42.02; 43/42.36
[58] Field of Search ................ 43/42.02, 42.11, 42.15, 43/42.36, 42.45

[56] References Cited

U.S. PATENT DOCUMENTS

| | | | |
|---|---|---|---|
| D.147,901 | 11/1947 | Findlay . | |
| 2,112,901 | 4/1938 | Anderson . | |
| 2,290,433 | 7/1942 | Jeffers | 43/42.36 |
| 2,312,585 | 3/1943 | Piro | 43/42.02 |
| 2,535,392 | 12/1950 | Dale . | |
| 2,770,063 | 11/1956 | Martin | 43/42.39 |
| 2,791,859 | 5/1957 | Wentworth | 43/42.02 |
| 2,910,799 | 11/1959 | Wentworth | 43/42.15 |
| 2,932,112 | 4/1960 | Graves | 43/42.02 |
| 2,948,982 | 8/1960 | Galpin . | |
| 2,986,837 | 6/1961 | Spugios . | |
| 3,735,518 | 5/1973 | Klein | 43/42.15 |
| 3,757,450 | 9/1973 | Martinez et al. . | |
| 4,744,167 | 5/1988 | Steele . | |
| 4,744,168 | 5/1988 | McClellan . | |
| 5,117,574 | 6/1992 | Perry . | |

FOREIGN PATENT DOCUMENTS

| | | | |
|---|---|---|---|
| 482582 | 4/1952 | Canada | 43/42.15 |
| 605711 | 9/1960 | Canada | 43/42.02 |

Primary Examiner—Kurt Rowan
Attorney, Agent, or Firm—Kerkam, Stowell, Kondracki & Clarke; John C. Kerins

[57] ABSTRACT

A two-piece artificial fishing lure produces both up-and-down and lateral motion without being substantially drawn through the water. The fishing lure is pivotally arranged to induce pivotal movement of the rear portion of the two-piece lure about a fixed pivotal connector. The force applied to the rear of the two-piece lure is such that the front portion of the two-piece lure is not required to move a significant distance through the water, thereby allowing the lure to remain in the strike or target zone for an extended period of time before recasting. The lure is provided with front and rear portions which are pivotally connected, and includes means extending through the first body portion for causing pivotal movement about the pivotal connector.

20 Claims, 3 Drawing Sheets

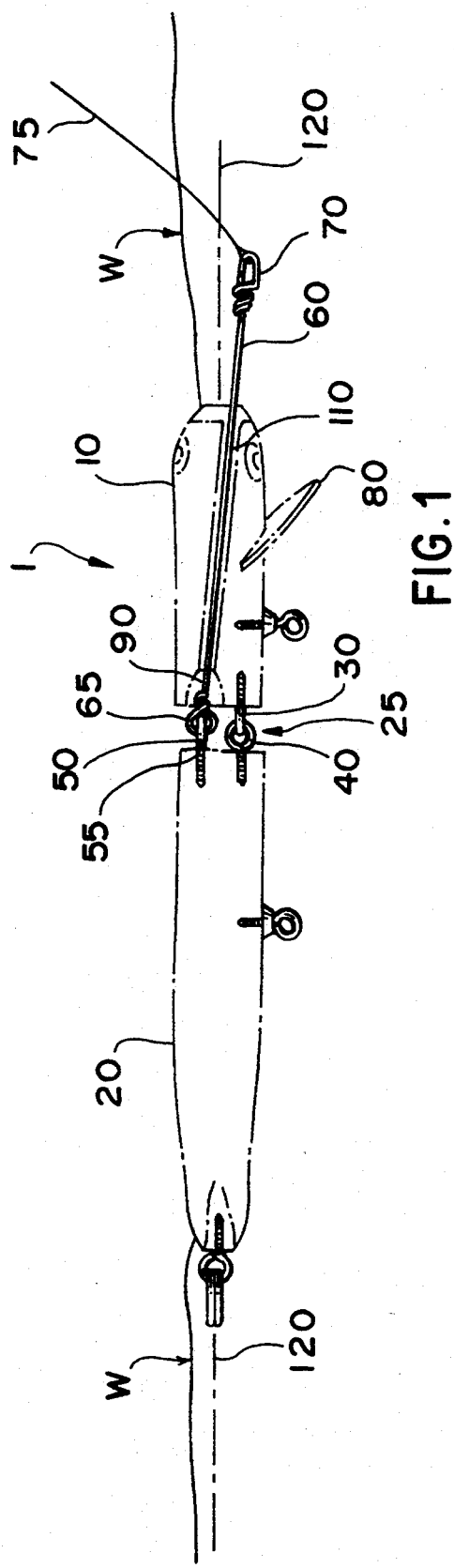
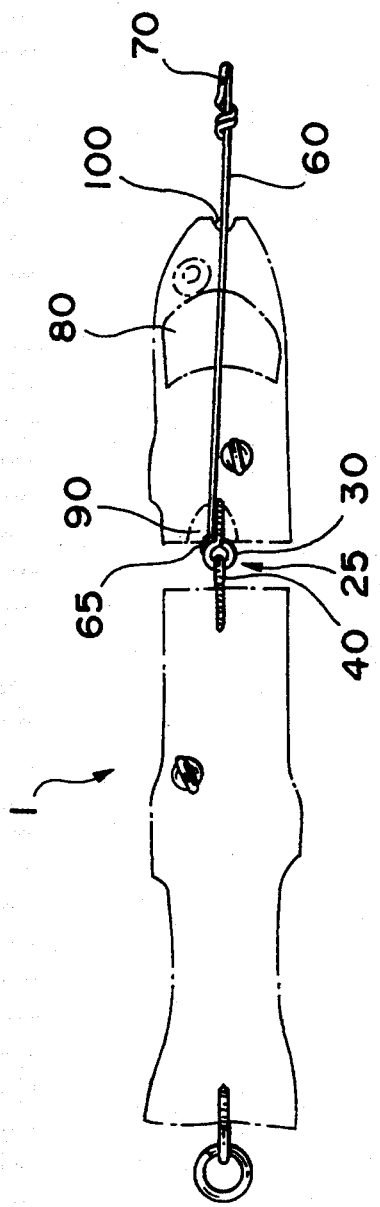
FIG.1
FIG.2

5,406,738

FISHING LURE

FIELD OF THE INVENTION

This invention relates generally to artificial fishing lures and specifically to a lure that simulates the actions of an injured minnow or other prey fish.

BACKGROUND OF THE INVENTION

There are many types of artificial fishing lures that have designs based on the action of a wide variety of prey, including, for example, minnows and worms. Most prior art lures must be drawn through the water at various depths in order to simulate the action of prey. By simulating the action of prey, these lures are somewhat effective in attracting fish and inducing the fish to strike at the lure. However, lures that must be drawn through the water have the inherent disadvantage of remaining in the strike zone for only a short period of time or passing through a target area before initiation of the action required to attract a fish. In addition, causing movement in the rear portion of the lure has heretofore been impossible in prior designs without effecting significant movement in the front portion of the lure through the water.

SUMMARY OF THE INVENTION

Therefore, in view of the shortcomings set forth above with respect to currently available artificial lures, it is an object of the present invention to provide an artificial lure that remains in the strike zone for an extended period of time relative to conventional water drawn lures.

Another object of the invention is to provide an artificial lure that accurately simulates the motion of prey without having to be drawn through water.

Another object of the invention is to provide an artificial lure that allows motion in a back portion of the lure without requiring substantial movement of the front portion of the lure through the water.

Yet another object of the invention is to provide a lure that resembles the action of an injured minnow.

Another object of the invention is to provide a lure that operates effectively at or very near the surface of the water.

In order to accomplish these and other objects and to overcome the shortcomings set forth above with respect to the prior art, an artificial fishing lure is provided that includes a first body portion; a second body portion; a first connector means for pivotally connecting said first and second body portions; and means extending through said first body portion and connected to said second body portion for causing pivotal movement about the first connector means.

BRIEF DESCRIPTION OF THE DRAWINGS

The invention will be described in detail below with reference to the following drawings in which like reference numerals refer to like elements and wherein:

FIG. 1 is a side view, in its initial operating position in the water, of the fishing lure of the present invention;

FIG. 2 is a bottom view of the fishing lure in outline showing various internal structures;

DETAILED DESCRIPTION OF THE PREFERRED EMBODIMENTS

In order to produce the desired action of certain prey, such as, for example, an injured minnow, the present invention introduces a pivotally arranged two-piece artificial fishing lure. To create the desired action in the lure, a force is applied to the rear of the two-piece lure to induce pivotal movement of the rear portion of the two-piece lure about a fixed pivotal connector. In addition, the force applied to the rear of the two-piece lure is such that the front portion of the two-piece lure is not required to move a significant distance through the water and the force is applied directly to the rear portion by the fishing line or an extension of the fishing line as it is manipulated by a fisherman. This application of force causes both up-and-down and bilateral movement of both sections of the lure, thereby simulating an injured minnow at or near the surface of the water.

Figure 4:
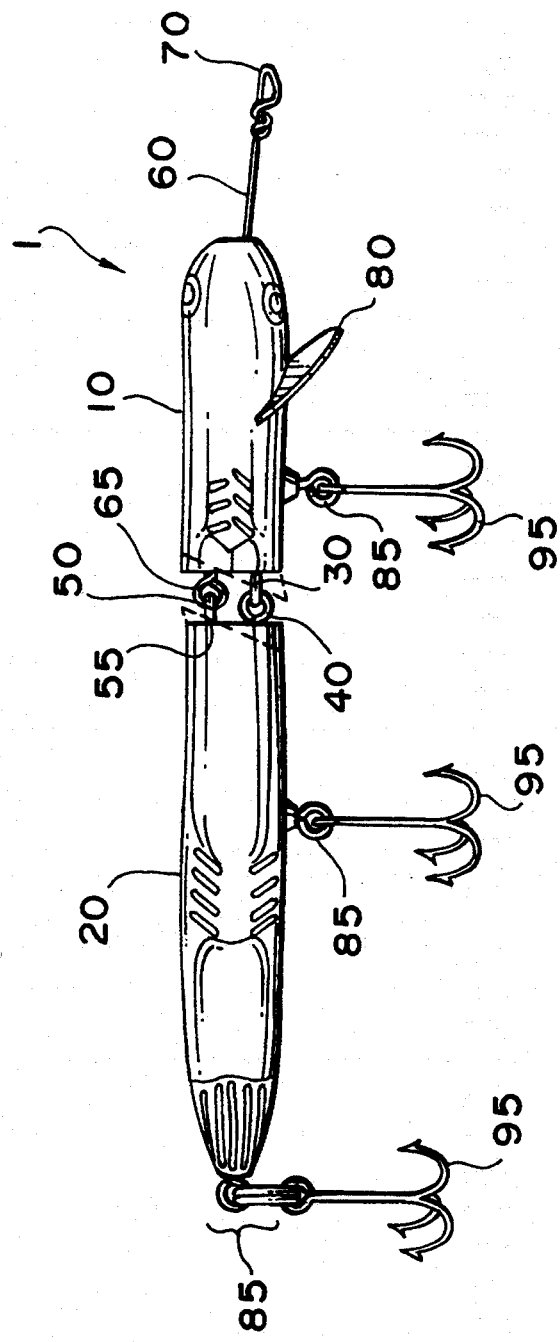
FIG. 4 is a side view of the fishing lure incorporating hooks.

Referring to FIGS. 1 and 4, an artificial fishing lure 1 according to a preferred embodiment of the present invention is shown. These views are referred to as side views even though they depict a top portion of a minnow, because the lure is intended to simulate an injured minnow floating on or near the surface of the water on its side. Stated another way, the top of the lure would be a side of the minnow it is intended to simulate.

The fishing lure 1 has a front body portion 10 and a rear body portion 20. The front and rear body portions may be constructed of a lightweight wood, plastic, or other materials known in the art of artificial lures. The front body portion 10 is connected to the rear body portion 20 by pivotal connector means 25 comprising, in the illustrated embodiment, a pair of eye hooks 30, 40 which are interlocked and arranged to allow pivotal movement of the rear body portion 20 relative to the front body portion 10. Eye hooks 30, 40 are connected, respectively, to front body portion 10 and to rear body portion 20 such that the planes in which the "eyes" are located are perpendicular to each other. It is also preferred that one of eye hooks 30, 40 is positioned such that the plane in which its "eye" is located will be substantially parallel with the surface of the water W (FIG. 1) when the lure is properly placed in the water.

The relative pivotal movement between the front and rear portions will generally be initiated by applying a force to the rear body portion 20 of the lure 1 at a point 55 offset from the pivotal connector means 25. For example, a third eye hook 50 which is spaced apart or offset from the pivotal connector means 25 and connected to the rear body portion 20 at point 55 may be used. A force may be exerted at or applied to point 55 via the eye hook 50 by an actuation wire 60 extending through the first body portion 10 and connected at a first end 65 to the eye hook 50, and at a second end 70 to a fishing line 75.

In addition, the front body portion 10 is provided with a bill 80 at a bottom thereof which provides resistance when the lure is lying at the surface of the water. The bill 80 extends downwardly and forwardly at an angle to the front body portion, and facilitates the application of force to the rear body portion 20 of the lure by providing resistance to movement of the front body portion 10 through the water when a force is applied to the fishing line. The bill 80 can also function to facilitate movement of the lure 1 in simulating an injured minnow by causing the lure 1 to dip when a large force applied through line 75 causes both pivotal movement and movement of the lure 1 through the water. The lure 1 is also preferably provided with hook receiving means 85 (FIG. 4), illustrated as eyelets, adapted to receive catching hooks 95 thereon.

FIGS. 1 and 2, which are side and top views, respectively, of the lure 1, are presented depicting internal features of the lure which contribute to the operation of the lure. Actuation wire 60 extends through the first body portion 10 via a bore 110. The bore 110 is preferably formed at an angle to the central longitudinal axis 120 of the lure 1. The bore 110 enters the front body portion 10 at a point lower than the center of the front body portion 10 and extends at an angle to the central longitudinal axis 120 in the direction of point 55 above central axis 120, which point is offset from the pivotal connector 25. In the example shown in FIGS. 1 and 2, the bore 110 is thus angled beginning from a point on the face of the front body portion 10 below the central longitudinal axis 120 of the front body portion 10 and exiting at a point above the central longitudinal axis 120 at the back end of the front body portion 10.

In addition, the bore 110 is angled from side-to-side, for example from a point at or to the left of a center point of the front body portion 10, the front entry of the bore being substantially longitudinally aligned with eye hook 40, and exiting at a point right of the central longitudinal axis 120. By angling the bore 110 in this manner, a greater range of motion of the rear body portion 20 about the pivot 25 can be achieved. Pivotal movement may still be induced if the bore 110 is not at an angle relative to the central longitudinal axis 120. However, the point of application of force 55 must be offset from the pivotal connector means 25. Additionally, a recess 90 is provided at the rear surface of front body portion 10 where the bore 110 exits from the front body portion 10. The recess 90 allows a greater degree of freedom for the wire 60 to move around in the bore and also accommodates movement of the connector 65 into the recess when the wire 60 is caused to move forward, which increases the range of forward travel of wire 60, thereby also increasing the potential angle of upward deflection of rear body portion 20 relative to front body portion 10.

As is readily apparent, when a force is applied to the wire 60 by a fisherman via fishing line 75, the wire 60 exerts a forward pulling force on point 55, thus inducing pivotal movement of the rear body portion 20 about the pivotal connection 25. Because the wire 60 extends through the front body portion 10 via the bore 110, the front body portion 10 will not have to be substantially displaced through the water in order to achieve the desired motion in the lure 1. Additionally, the bill 80 provides resistance against movement of the front body portion 10 through the water when a force is applied to point 55 via the wire 60.

The front body portion 10 is also provided with a groove 100 extending across the front of the front body portion 10. The groove 100 enhances the pivotal movement of the front body portion 10 when a force is applied to the wire 60. Once again, the front body portion 10 need not be significantly displaced through the water to induce the lateral and up-and-down relative movement between front and rear body portions 10, 20 of the lure 1.

Figure 3:
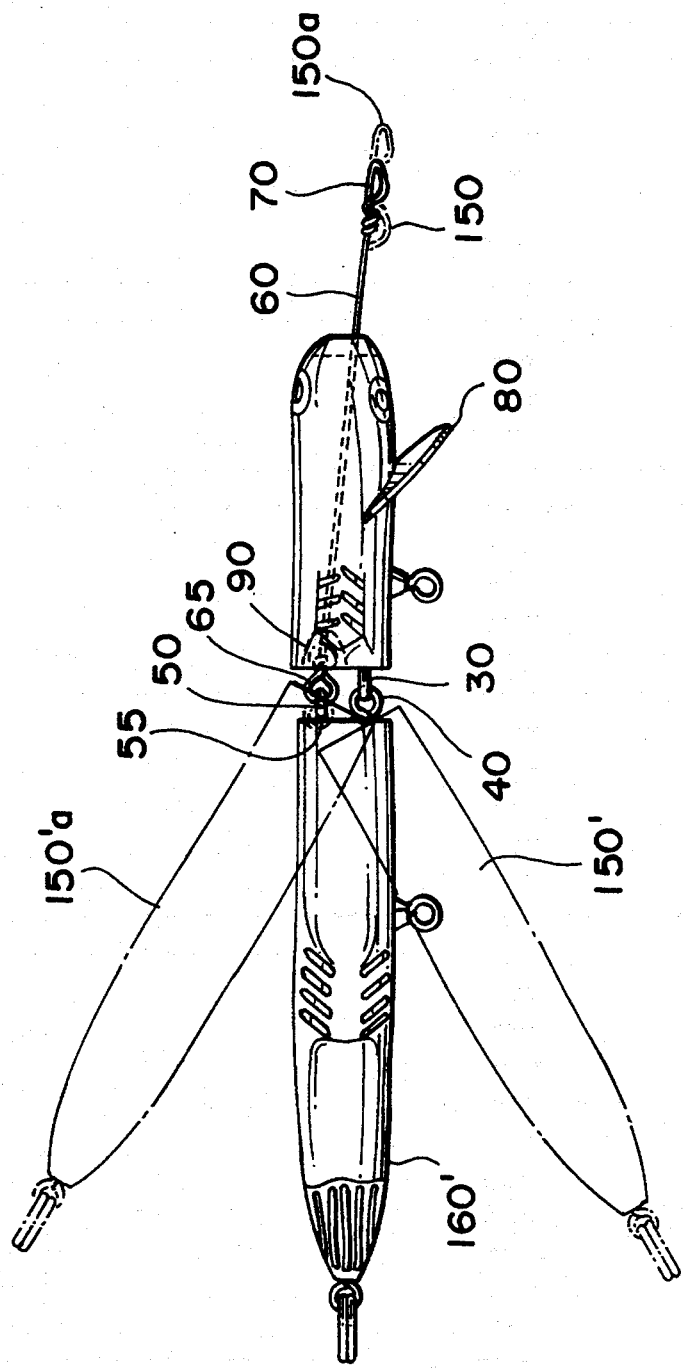
FIG. 3 is a side view of the fishing lure showing various operative positions.

When the lure 1 is cast, it is designed to float at the surface of the water W with the bill 80 being submerged in the water. It is to be recognized, however, that the same pivot-action lure design can be employed as a deep-water lure as well. Referring to FIG. 3, the lure 1 is shown laying as it would be floating in the water. When the wire 60 is pulled by a fisherman via the fishing line 75 (FIG. 1), the wire 60 is displaced in the direction that the fishing line is being pulled, for example, from resting position 160 to position 150a. The force applied to the point 55 causes the rear body portion 20 of the lure 1 to pivot to position 150'a.

The movement of the rear body portion 20 is more dramatic than that of the front body portion 10. Movement of the front body portion 10 is more affected by the groove 100 and the bill 80, in response to the pulling of the fishing line. The rear end connector 65 of the wire 60 is received into recess 90 when wire 60 is pulled forward. When the pulling force of the fishing line is released by the fisherman, reverse movement of the rear body portion 20 to position 150' may occur before returning to resting position 160'. Thus, by applying a force to point 55 on the rear body portion 20 of the lure via a bore 110 extending through the front body portion 10 of the lure 1, the lure 1 simulates the action of an injured minnow by moving both laterally and in an up-and-down direction. In addition, the lure may oscillate between positions 150'a and 150 when the surface of the water becomes mildly rough or choppy.

The use of eye hook 50 as the connector for the actuating means is not an absolute requirement. In addition wire 60 may be dispensed with in appropriate circumstances if fishing line 75 is extended through bore 110 into attachment at point 55. Thus, in an alternative embodiment, the actuating force may be applied to point 55 on the rear body portion 20 directly by the fishing line 75 or by the fishing line in combination with the wire 60, without the need for eye hook 50. The fishing line, or wire 60, may be attached directly to may be constructed integrally with the rear body portion 20 at point 55. In addition, the requirement of a wire 60 may also be eliminated. A fishing line may be extended through the bore and tied off to a suitable attachment means provided at point 55 to effect similar movement of the lure 1, wherein the attachment means may be eye hook 50 or any other suitable structure enabling the line to be tied off at that point.

One further alternative preferred embodiment of the lure is also depicted in FIG. 4 in broken lines. The main embodiment shown in all figures has the rear surface of front body portion 10 and the front surface of rear body portion 20 disposed substantially perpendicularly to the longitudinal axis 120 (FIG. 1) of the lure. These surfaces, however, may be oriented at an oblique angle to the longitudinal axis, while still providing the advantages of the lever-type pivot action of the lure. The broken lines in FIG. 4 illustrate how these surfaces may be obliquely oriented. This embodiment has some advantage in that it minimizes or eliminates the "see through" property of the simulated minnow body possessed by the previously described preferred embodiment.

While this invention has been described and illustrated in conjunction with specific embodiments thereof, it is evident that many alternatives, modifications and variations will be apparent to those skilled in the art. Accordingly, the preferred embodiments of the invention as set forth herein, are intended to be illustrative, and not limiting. Various changes may be made without departing from the spirit and scope of the invention as set forth in the written description and the scope of the invention is to be determined by reference to the appended claims.

What is claimed is:

1. A fishing lure comprising
   a lure body consisting of a first body portion and a second body portion, a back end of said first body portion being in facing relation to a front end of said second body portion
   first connector means for pivotally connecting said back end of said front portion to said front end of said second body portion; and
   means extending through said first body portion and also connected to said front end of said second body portion adjacent said back end of said first body portion for causing pivotal movement about said first connector means.

2. The fishing lure of claim 1, wherein said first body portion further comprises a bore extending from a front end of said first body portion to a back end of said first body portion, said bore adapted to receive said means for causing pivotal movement.

3. The fishing lure of claim 2, further comprising a groove extending across the front end of said first body portion, a first end of said bore being disposed in a recessed portion of said groove.

4. The fishing lure of claim 2, wherein said means for causing pivotal movement comprises a substantially rigid wire extending through said bore.

5. The fishing lure of claim 4, wherein said wire has connector means for connecting said wire to a fishing line.

6. The fishing lure of claim 1, further comprising a bill attached to a bottom side of said first body portion, said bill being disposed at an angle to said first body portion and extending toward a front of said first body portion.

7. The fishing lure of claim 1, further comprising at least one means for receiving at least one hook.

8. A fishing lure comprising:
   a first body portion;
   a second body portion;
   said first body portion and said second body portion extending in an axial direction along a common central longitudinal axis;
   first connector means for pivotally connecting a back end of said first body portion to a front end of said second body portion said first connector means being attached to said first body portion at said back end thereof and attached to said second body portion at said front end thereof; and
   means extending through said first body portion and connected at said front end of said second body portion for causing pivotal movement about said first connector means, wherein said first body portion further comprises a bore entering a front end of said first body portion and exiting said back end of said first body portion at a location spaced apart from said first connector means, said bore adapted to receive said means for causing pivotal movement, wherein said bore extends through said first body portion at an angle relative to said common central longitudinal axis of said first and said second body portions.

9. A fishing lure comprising:
   a first body portion;
   a second body portion;
   first connector means for pivotally connecting said first and second body portions; and
   means extending through said first body portion and connected to a front end of said second body portion adjacent a back end of said first body portion for causing pivotal movement about said first connector means, wherein said first body portion further comprises a bore extending from a front end of said first body portion to a back end of said first body portion, said bore adapted to receive said means for causing pivotal movement, said fishing lure further comprising a recess at a point where said bore exits said first body portion at the back end of said first body portion.

10. A fishing lure comprising:
    a first body portion;
    a second body portion;
    first connector means for pivotally connecting said first and second body portions; and
    means extending through said first body portion and connected to said second body portion for causing pivotal movement about said first connector means, wherein said first body portion further comprises a bore extending from a front end of said first body portion to a back end of said first body portion, said bore adapted to receive said means for causing pivotal movement, and wherein said first connector means comprises a first eye screw attached to said first body portion and a second eye screw attached to said second body portion, an eye of said first eye screw being interlocked with an eye of said second eye screw.

11. The fishing lure of claim 10, wherein said means for causing pivotal movement further comprises a third eye screw attached to said second body portion, said third eye screw being offset from said first connector means.

12. The fishing lure of claim 11, wherein said means for causing pivotal movement comprises a substantially rigid wire extending through said bore, and wherein said wire has means at a rearward end thereof for connecting said wire to said third eye screw.

13. A fishing lure for connection to a fishing line, said fishing lure comprising:
    a first body portion;
    a second body portion;
    first connector means for pivotally connecting a rear face portion of said first body portion to an adjacent front face portion of said second body portion said rear face portion and said front face portion being disposed in facing relation; and
    second connector means disposed at said front face portion of said second body portion, and being offset from said first connector means, for being operatively connected to said fishing line, and
    wherein said first body portion further comprises a bore entering a front end of said first body portion and exiting through said rear face portion of said first body portion at a position offset from said first connector means, said fishing line being operatively connected to said second connector means through said bore.

14. The fishing lure of claim 13, wherein said first body portion and said second body portion extend axially along a common central longitudinal axis, and wherein said bore extends though said first body portion at an angle relative to said common central longitudinal axis.

15. The fishing lure of claim 13, wherein said fishing line is connected to a substantially rigid wire, said wire extending through said bore and being connected to said second connector means.

16. The fishing lure of claim 13, further comprising a groove extending across the front end of said first body portion, a front part of said bore being disposed in a recess created by said groove.

17. The fishing lure of claim 13, further comprising at least one means for receiving at least one hook.

18. A fishing lure for connection to a fishing line, said fishing lure comprising:
   a first body portion;
   a second body portion;
   first connector means for pivotally connecting said first and second body portions; and
   second connector means offset from said first connector means for being operatively connected to said fishing line, wherein said first body portion further comprises a bore extending from a front end of said first body portion to a back end of said first body portion, said fishing line being operatively connected to said second connector means through said bore, and wherein said first connector means comprises a first eye screw attached to said first body portion and a second eye screw attached to said second body portion, and wherein the eyes of said first and second eye screws are interlocked.

19. The fishing lure of claim 18, wherein said second connector means comprises a third eye screw.

20. A fishing lure for connection to a fishing line, said fishing lure comprising:
   a first body portion;
   a second body portion;
   first connector means for pivotally connecting a rear portion of said first body portion to an adjacent front portion of said second body portion; and
   second connector means disposed at said front portion of said second body portion, and being offset from said first connector means, for being operatively connected to said fishing lure,
   wherein said first body portion further comprises a bore extending from a front end of said first body portion to said back portion of said first body portion, said fishing line being operatively connected to said second connector means through said bore; said fishing lure further comprising a recess disposed at a point where said bore exits said first body portion at the back end of said first body portion.

* * * * *